Nov. 13, 1951  F. W. BANKA  2,575,038
POWERED TRIMMER
Filed July 19, 1945  3 Sheets-Sheet 1
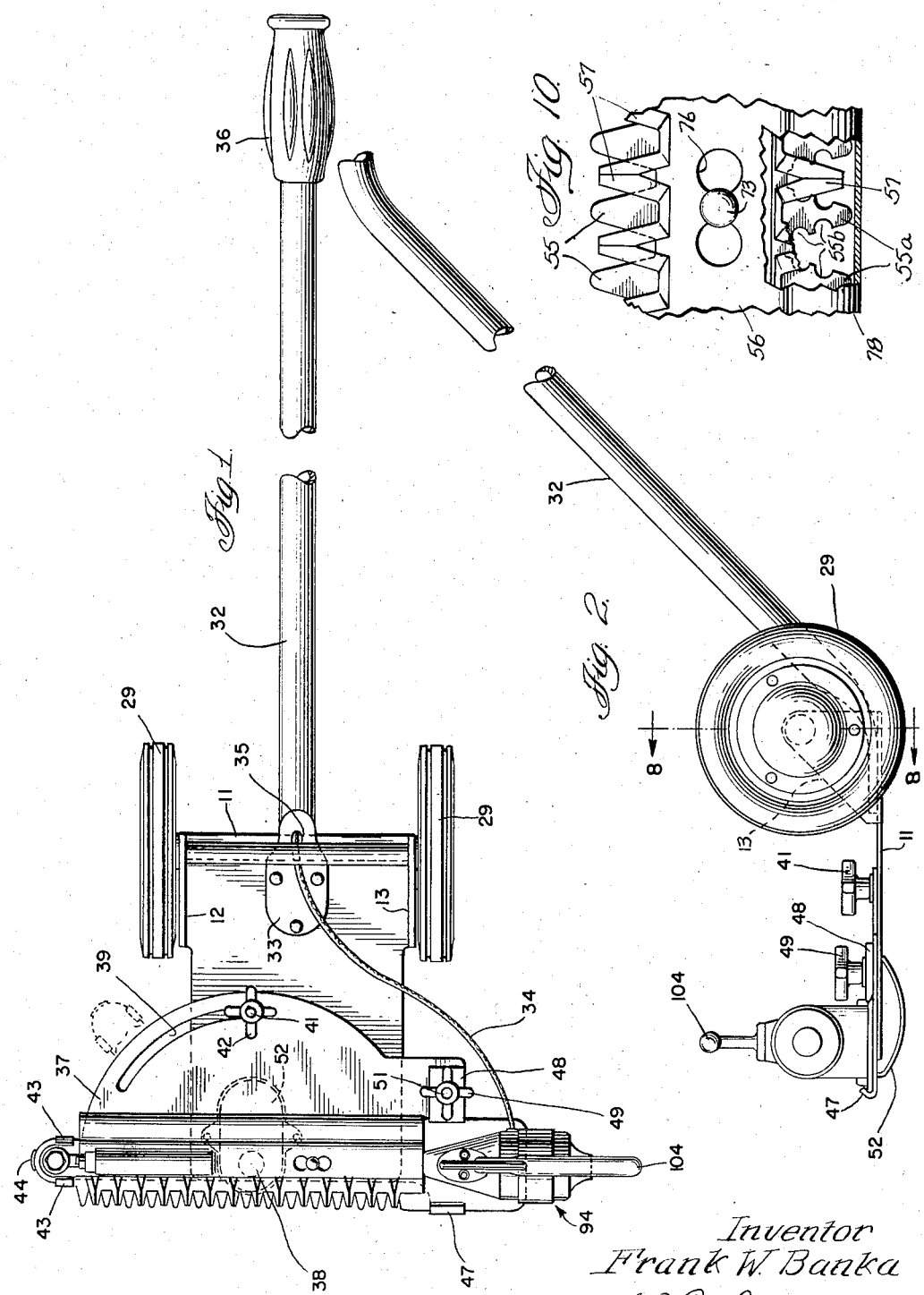
Inventor
Frank W. Banka
By SJCollons
Atty Nov. 13, 1951   F. W. BANKA   2,575,038
POWERED TRIMMER
Filed July 19, 1945   3 Sheets-Sheet 2
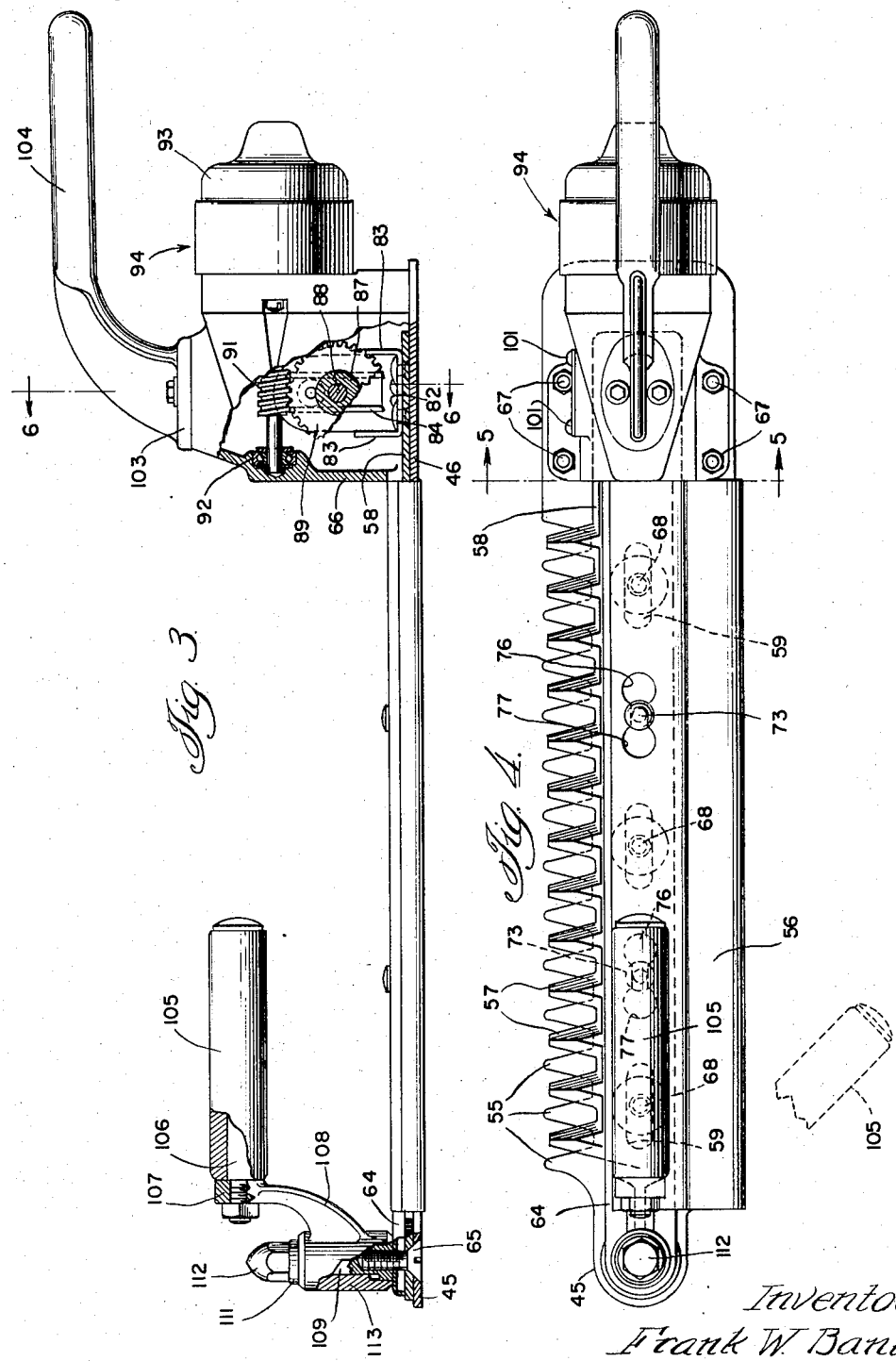
Inventor
Frank W. Banka
By SJCollins
Atty Nov. 13, 1951     F. W. BANKA     2,575,038
POWERED TRIMMER
Filed July 19, 1945     3 Sheets-Sheet 3
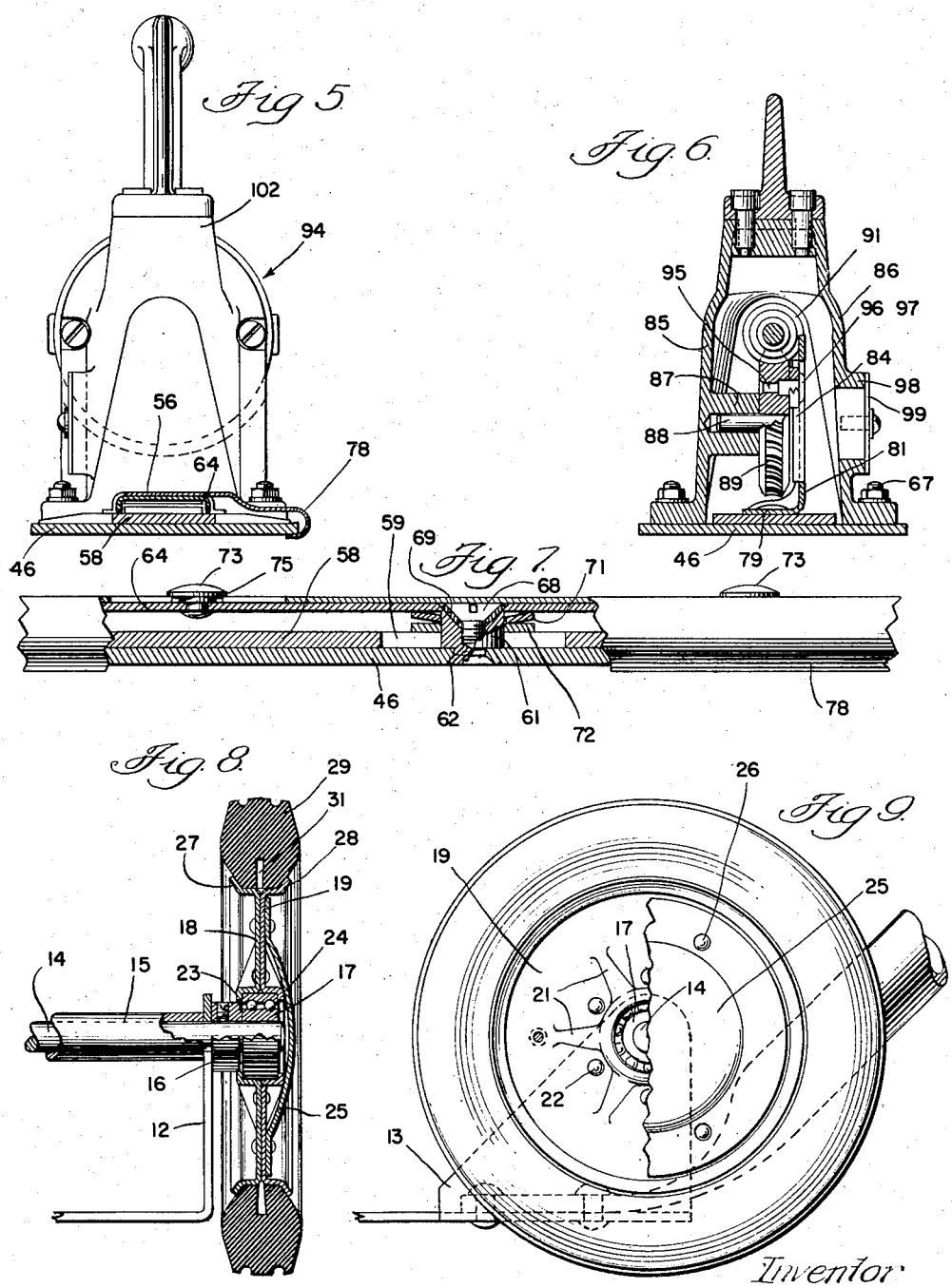
Inventor
Frank W. Banka
By S. J. Collons
Atty.

Patented Nov. 13, 1951

2,575,038

UNITED STATES PATENT OFFICE 2,575,038

POWERED TRIMMER

Frank W. Banka, Park Ridge, Ill.

Application July 19, 1945, Serial No. 605,903

3 Claims. (Cl. 30—216)

The present invention relates to shrubbery, grass and hedge trimming apparatus and is more particularly concerned with a device of this class which is power driven, portable and adaptable to vehicular incorporation.

In the performing of supplementary lawn and garden trimming operations following the conventional lawn mowing and pruning performances the trimming of grass and hedges, particularly where these operations adjoin buildings, fences and other solid objects, the task of manually trimming is notably onerous and is beset with considerable physical fatigue. Frequently where an operator performs these operations during spare hours the tediousness and slowness of these tasks render the work difficult to perform within the allotted or available time, and it is proposed herewith to provide an apparatus which will not only render this work more convenient to execute by eliminating the strenuous or exerting effects, but in addition by speeding up the efficiency of trimming operations to make it possible to complete a greater compass of achievement within a given period of time thereby making feasible gardening attendance and lawn attention as a spare time or hobbyist function.

In addition to the foregoing objects, it is proposed by means of the present improvement to render professional services less time-consuming and arduous. With the foregoing and other objects in view, the present invention consists briefly in a power driven lawn trimming apparatus utilizing two double edged and longitudinally reciprocable cutter blades. A rotary electrically driven motor operates a power transmission mechanism which translates the rotary motion into longitudinal reciprocal motion of one of the cutter blades. A guard which is secured by keyhole slide fittings and is reversible so as to afford balance and maneuverability permits the device to be safely and conveniently held while the cutting edge is presented in close proximity to fringe grasses, hedges and shrubbery. The apparatus may be conveniently maneuvered so as to produce nicely executed shingling, tapering and trimming operations.

In addition there is incorporated with the trimmer unit a wheeled truck having an adjustable turntable so arranged that oblique cutting effects as well as transverse operations may be executed. The current supply cord is led through a truck handle to the motor casing and the arrangement of elements is convenient in accordance with the proposed design so as to afford greater facility at minimum operational hazards.

For a better understanding of the instant invention, reference will now be had to the accompanying drawings and to the following detailed specification wherein like reference characters designate corresponding parts throughout and wherein:

Fig. 1 is a plan view of the present invention together with its wheeled operational truck and guide handle;

Fig. 2 is a side elevation of the invention featured in Fig. 1;

Fig. 3 is a side elevation with portions broken away of the motor driven hedge trimmer unit;

Fig. 4 is an enlarged plan view of the apparatus featured in Fig. 3;

Fig. 5 is a transverse sectional view taken approximately on line 5—5 of Fig. 4.

Fig. 6 is a transverse detail sectional view taken approximately on line 6—6 of Fig. 3;

Fig. 7 is an enlarged fragmentary side elevation of the cutter assembly partially in section to reveal the guard and tensioning elements;

Fig. 8 is a transverse sectional view taken on line 8—8 of Fig. 2;

Fig. 9 is an enlarged detail view of the truck wheel construction; and

Fig. 10 is an enlarged detail plan view with parts broken away to disclose the shearing and shrub trimming teeth on opposite edges of the unit.

Referring now more particularly to the accompanying drawings, the reference character 11 designates a truck base consisting of a horizontal bed plate with which are formed a pair of symmetrical and opposite journal supporting side pieces 12 and 13. An axle 14, Figs. 8 and 9, extends transversely the width of the truck and is sheathed in a protective sleeve 15 which may, if preferred, be welded or otherwise secured to the side frame elements 12 and 13.

A spacing collar 16 is held by a set screw to the shaft 14 and adjacent the latter collar element a bearing assembly generally designated 17 is provided on the outer race of which are assembled the symmetrically opposite wheel disc components 18 and 19.

The latter members have reinforcing spoke rib formations 21 between which the assembly is riveted together as at 22 so that the overhanging flanges 23 and 24 render the wheel unit together with its bearing a unitary assembly. In order to protect the bearing against dust infiltration a cover disc 25 is preferably riveted as at 26 to the wheel discs, Figs. 8 and 9.

The peripheral extremities of the discs 18, 19 are flanged as at 27 and 28 and during the assembly a solid rubber tire 29 is placed and through its annular groove 31 is suitably compressed between the flanges 27 and 28 affording thereby generous holding tension while contributing an element of flexibility and resiliency appropriate for the particular purpose. It is contemplated that the wheel assembly thus constructed will afford adequate life and traction facilities commensurate with the general purpose of the device and that adequate lubrication may be originally incorporated so as to eliminate from need of attention any detail of servicing thereafter, since ample grease or lubricant may be retained and since the tire tread surfaces of a solid rubber element are compensatory within the contemplated serviceability to which the trimmer supporting truck may be subjected.

The guide handle 32 is made of a tubular element formed as best indicated in Fig. 2 and flattened as at 33 for rivet securement to the truck plate 11. Through the hollow of handle 32 there extends the power supply cable 34 which protrudes through an opening 35 and which extends through the handle grip 36. A turntable plate 37 is pivotally secured as at 38 to the plate 11 and its movement with respect to plate 11 throughout an angle of approximately 45° is determined by the arcuate slot 39 in said turntable 37 through which there passes an anchor bolt 41 carrying a spindle nut 42. One end of the turntable plate 37 is provided with a pair of guide ribs 43 and a limit lug 44 shaped to receive the curved extremity 45 of the trimmer base knife 46. A cooperating inert guide lug 47 also integral with the turntable 37 receives one edge of the rearward solid portion of the base knife 46 whose opposite edge is thereafter engaged in clamping relationship by a cam lug 48 held down in adjustable relationship with the lug 47 by a spindle nut 49 and cooperating bolt 51.

Thus the trimmer base plate or knife is held in position on the turntable 37 while the latter member is secured to the truck plate 11 by means of the bolt and nut elements 41 and 42. As best indicated in Fig. 2, the truck is supported not only by the rear wheels 29 but in addition a forward skid 52 which is bowed so as to afford to the truck plate 11 the proper spacing or clearance from the ground level.

The trimmer unit, which, as has been said, is independently maneuverable in the condition in which it is featured in Figs. 3 and 4 or is operated in truck supporting condition as featured in Figs. 1 and 2, consists of the supporting base plate 46 having the cutter teeth 55 and 55a formed on its opposite edges, one of which is exposed in Fig. 4 and the other of which is hidden by the guard 56. The teeth 55 and 55a are equally spaced and are preferably bevel sharpened so as to afford scissor edge cooperation with generally similar teeth 57 in the longitudinally reciprocal blade 58. In addition, the teeth 55a are preferably provided with circular notchings or serrations edgewise thereof to serve the purpose of biting into and securing twigs and heavier shrub stems such as might otherwise slip out of simple shear edges during reciprocation. The movement of blade 58 is confined by a series of three elongated slots 59, Figs. 4 and 7, through which pass anchor stud pins 61 riveted as at 62 in the base plate 46. The anchor studs 61 are internally threaded to receive flat headed recess screws 68, Fig. 7, and are of sufficient width to chamber within the slots 59, as best indicated in Fig. 4.

The distance of movement longitudinally of blade 58 is such as to correspond with the spacing between the teeth 57 and this distance also relates to the distance between the teeth 55 and 55a of the base cutter plate 46.

A cover frame 64, the details of which are best discernible in Figs. 4, 5 and 7, extends from the anchor screw 65 at the left of the apparatus as featured in Figs. 3 and 4 rightwardly into abutting relationship with the gear housing box 66 which is bolted to the base plate as at 67. The cover frame 64 is an inverted channel member, Fig. 5, which is held down by three flat-headed countersunk screws 68, Fig. 4, and whose opposite flanges preferably clear the upper surface of the reciprocable blade 58. In order to insure against inadvertent loosening, the heads of screws 68 are preferably checked as by means of a conical lock washer 69 shaped to conform with a conical recess in the upper portion of the riveted stud pins or anchor studs 61. The threaded holes in the stud pins 61 are preferably blind so as to insure against irregularities in the under surface of the base plate 46.

The assembly is thus maintained relatively rigid while at the same time a resilient pressure or tension is applied against the upper surface of reciprocable blade 58 by means of a split or bowed-wafer type of tensioning washer 71 which exerts its pressure between the under surface of the channel frame 64 and the top surface of an anti-friction material washer 72 which rests against the reciprocable blade 58, Fig. 7.

A pair of headed anchor pins 73 is provided, secured as by riveting into the cover frame 64. Each pin 73 includes a necked portion 75 spaced between its head and the top surface of the cover frame 64 so that when the guard 56 is applied by insertion of the heads 73 through one or the other of the keyhole openings 76 or 77 and the guard thereafter moved into abutment with the forward wall of the housing box 66, the protective skirt 78 of said guard 56 may be securely positioned to encompass one side or the other of the mower teeth 55 and 57 or 55a and 57 thereby preparing the apparatus especially for grass cutting or for shrubbery and hedge trimming.

At its rightward extremity, the reciprocable blade 58 has riveted to its top surface a stanchion bracket consisting of the base plate 79 and of the upright plate 81. The bracket is secured to the blade 58 by means of rivets 82, Fig. 3, and is reinforced by means of the integral side plates 83. The vertical wall of the stanchion bracket 81 has formed throughout its center portion a vertical opening flanked by the inwardly bent bearing ridges 84, Fig. 6.

The side walls 85 and 86 of the housing 66 are slightly tapered inwardly and wall 85 is provided with an inwardly extending embossment 87 drilled to afford a journal to the shaft 88 which carries the driven pinion or worm wheel 89. The driving worm 91 through which worm wheel 89 is empowered is fast to the motor shaft, one end of which is journaled in a frictionless bearing 92 embedded in the forward wall of the housing 66 and the other end of which is appropriately journaled within the case 93 of the motor generally designated 94.

The inner surface of driven worm wheel 89 carries an anchor stud 95 which is secured as by riveting into the body of wheel 89 and which is provided with a head 96 spaced so as to afford free rotation to an idler roller 97 of such diameter as to ride between the side ridges 84 of the stanchion bracket 79 and 81.

In order to afford accessibility to the internal apparatus and to permit machining operations during manufacture, the side wall 86 of boss 66 is equipped with an outwardly extending embossment 98 the surface of which is machined and sealed by a cover plate 99 held in place by the securement screws 101.

Accessibility to the housing 66 is also afforded through a top opening provided in the turret formation 102, Fig. 5, which is normally sealed by the combination cover plate and handle designated 103 and 104. This handle is relatively rigid and contrasts thereby from the swingable handle 105 which is pivotally supported on an anchor stud 106 that is threaded into the ear 107 of a pivot bracket 108, Fig. 3. Bracket 108 is vertically pivotable on a stud 109 and secured against removal by means of the washer 111 and ornamental nut 112. The pivot sleeve 113 of bracket 109 is thereby supported between the washer 111 and the upper surface of the cover frame 64.

When used in conjunction with the wheel truck, as portrayed in Figs. 1 and 2, the handle 105 is preferably positioned as indicated in solid outline in Figs. 1, 3 and 4 alternatively; however, the handle 105 may be swung for example into the position indicated by the fragmentary dotted outline in Fig. 4 when the apparatus is to be employed as a manually portable cutter or hedge trimmer. In the latter case the handle 105 may be reversed and the apparatus employed in a manner exposing teeth 55a and with the protective guard 56 covering teeth 55.

During operation the rotation of the motor shaft of motor 94 carrying the worm 91 causes to be rotated the worm wheel 89 and imparts cyclic rotation to the idler roller 97. The latter member imparts reciprocable movement to the stanchion 79 and 81, which in turn transmits similar movement to the reciprocable blade 58. Current for the motor 94 may be supplied through the conduit or cable 34 as already mentioned which may extend through the handle 32 of the wheeled supporting truck or which may be a free cable in the case of manually portable operations.

There is herewith accordingly described a utility grass and hedge trimming apparatus that lends itself to wheeled as well as portable operation within a single structural contemplation. While the present invention has been explained and described with reference to specifically expressed and illustrated embodiments, it is to be understood nevertheless that numerous variations and modifications are susceptible of incorporation without departure from the essential spirit or scope thereof. It is accordingly intended that this invention be not limited to the specific recitations contained in the foregoing description nor to the particulars illustrated in the accompanying drawings, except as indicated in the hereunto appended claims.

The invention claimed is:

1. In a portable power driven hedge trimmer, a base blade and a cutter blade assembly in wiping contact with each other, each having cutting teeth on both of its opposite parallel edges, a housing support forming a continuation of said base blades, studs anchored in said base blade, extending through slots in said cutter blade whereby to direct and limit the movement of said cutter blade in respect to said base blade, a housing bolted to said housing support and presenting a stop shoulder transverse to said blades, an electric motor attached to said housing and including a shaft journaled in said housing, a gear driven by said shaft journaled on a cantilever stud within said housing, a stanchion bracket rigidly secure to said cutter blade for receiving reciprocal motion from said gear, a mounting strip carried by said anchored studs, headed stud pins integral with said stud mounting strip, and a sheet metal guard including a mount portion having apertures for receiving said stud pins, said apertures comprising elongated slots terminating at each end with enlarged circular clearances whereby said guard may be applied to said stud pins reversibly to cover one or the other of the opposite cutting edges of said blade assembly.

2. In a portable power driven hedge trimmer, a base blade comprising a longitudinal flat steel member having cutting teeth on opposite side edges and being formed at one end with a housing support extension, a cutter blade overlying said base blade having at its opposite side edges toothed formations in overlying wiping engagement with the cutting teeth of said base blade and being provided at its longitudinal center with a series of spaced guiding and confinement slots, studs anchored in said base blade extending through said slots whereby to limit and direct the movement of said cutter blade to accomplish intersection of the toothed formations on said opposed edges of said base and cutter blades, an enclosure housing bolted to said base blade extension and providing a channel for receiving therethrough a narrow extending portion of said cutter blade, a mounting strip extending longitudinally of and spaced from said cutter blade secured to said studs, headed anchor pins carried by said strip, and a sheet metal protecting sheath having a blade edge covering portion and a mount panel portion, said mount panel portion being provided with double keyhole slots spaced in accordance with the distribution of said anchor pins for receiving the heads of said anchor pins under alternative conditions of application whereby said sheath cover portion may be applied to protect one edge or the other of said base and cutter blade toothed edges.

3. The combination set forth in claim 2 including a rigid L-shaped handle casting mounted on said housing and extending longitudinally of said base, and a handle comprising a grip member rotatable throughout a limited area at the end of said base blade opposite said housing.

FRANK W. BANKA.

No references cited.